(12) United States Patent
Iwazaki et al.

(10) Patent No.: US 11,618,156 B2
(45) Date of Patent: Apr. 4, 2023

(54) HORIZONTAL ARTICULATED ROBOT AND HORIZONTAL ARTICULATED ROBOTIC SYSTEM

(71) Applicant: Seiko Epson Corporation, Toyko (JP)

(72) Inventors: Tomohisa Iwazaki, Shimosuwa (JP); Yutaka Arakawa, Hara (JP)

(73) Assignee: SEIKO EPSON CORPORATION

( * ) Notice: Subject to any disclaimer, the term of this patent is extended or adjusted under 35 U.S.C. 154(b) by 57 days.

(21) Appl. No.: 17/238,357

(22) Filed: Apr. 23, 2021

(65) Prior Publication Data

US 2021/0331308 A1  Oct. 28, 2021

(30) Foreign Application Priority Data

Apr. 24, 2020  (JP) .............................. JP2020-077536

(51) Int. Cl.
| | | |
|---|---|---|
| *B25J 9/00* | (2006.01) | |
| *B25J 9/06* | (2006.01) | |
| *B25J 9/12* | (2006.01) | |
| *B25J 13/08* | (2006.01) | |
| *B25J 17/02* | (2006.01) | |
| *B25J 18/02* | (2006.01) | |
| *B25J 9/16* | (2006.01) | |

(52) U.S. Cl.
CPC ............... *B25J 9/06* (2013.01); *B25J 9/126* (2013.01); *B25J 9/1697* (2013.01); *B25J 13/086* (2013.01); *B25J 17/0283* (2013.01); *B25J 18/025* (2013.01)

(58) Field of Classification Search
CPC ... B25J 9/06; B25J 9/126; B25J 9/1697; B25J 13/086; B25J 17/0283; B25J 18/025
See application file for complete search history.

(56) References Cited

U.S. PATENT DOCUMENTS

| | | | |
|---|---|---|---|
| 2018/0001487 A1* | 1/2018 | Miyasaka | B25J 9/0009 |
| 2018/0345484 A1* | 12/2018 | Miyamoto | B25J 13/085 |
| 2019/0030709 A1* | 1/2019 | Toshimitsu | B25J 9/046 |
| 2019/0091853 A1* | 3/2019 | Toshimitsu | B25J 9/0084 |
| 2019/0126466 A1* | 5/2019 | Owa | B25J 9/1025 |
| 2020/0030969 A1* | 1/2020 | Iwazaki | B25J 17/025 |

FOREIGN PATENT DOCUMENTS

| | | | |
|---|---|---|---|
| JP | 2016-041453 A | 3/2016 | |
| JP | 2020-028923 A | 2/2020 | |
| WO | WO-2016069659 A1 * | 5/2016 | ............. A61B 34/30 |

* cited by examiner

*Primary Examiner* — Zakaria Elahmadi
(74) *Attorney, Agent, or Firm* — Harness, Dickey & Pierce, P.L.C.

(57) ABSTRACT

The horizontal articulated robot includes a platform, a first arm which is coupled to the platform, which moves along a first linear-motion axis with respect to the platform, and which rotates around a first rotational axis parallel to the first linear-motion axis, a second arm which is coupled to the first arm, which moves along a second linear-motion axis different in direction from the first linear-motion axis with respect to the first arm, and which rotates around a second rotational axis parallel to the first rotational axis, a third arm which is coupled to the second arm, and which rotates around a third rotational axis perpendicular to the first linear-motion axis, and a fourth arm which is coupled to the third arm, and which rotates around a fourth rotational axis perpendicular to the third rotational axis.

11 Claims, 9 Drawing Sheets

HORIZONTAL ARTICULATED ROBOT AND HORIZONTAL ARTICULATED ROBOTIC SYSTEM

The present application is based on, and claims priority from JP Application Serial Number 2020-077536, filed Apr. 24, 2020, the disclosure of which is hereby incorporated by reference herein in its entirety.

BACKGROUND

1. Technical Field

The present disclosure relates to a horizontal articulated robot and a horizontal articulated robotic system.

2. Related Art

The horizontal articulated robot described in JP-A-2016-41453 (Document 1) has a base part, a first arm coupled to the base part so as to be able to rotate around a first rotational axis, a second arm coupled to the first arm so as to be able to rotate around a second rotational axis parallel to the first rotational axis, a guide shaft coupled to the second arm so as to be able to rotate around a third rotational axis parallel to the first rotational axis, so as to be able to move in a direction along the third rotational axis, and an end effector coupled to a tip of the guide shaft.

However, in the horizontal articulated robot described in Document 1, since the position and the posture of the end effector are controlled only by motions of the first arm, the second arm, and the guide shaft, the direction in which the end effector can approach a work is limited. Therefore, there is a problem that a restriction is easily applied to operations which the horizontal articulated robot can perform.

SUMMARY

A horizontal articulated robot according to an application example of the present disclosure includes a platform, a first arm which is coupled to the platform, which moves along a first linear-motion axis with respect to the platform, and which rotates around a first rotational axis parallel to the first linear-motion axis, a second arm which is coupled to the first arm, which moves along a second linear-motion axis different in direction from the first linear-motion axis with respect to the first arm, and which rotates around a second rotational axis parallel to the first rotational axis, a third arm which is coupled to the second arm, and which rotates around a third rotational axis perpendicular to the first linear-motion axis, and a fourth arm which is coupled to the third arm, and which rotates around a fourth rotational axis perpendicular to the third rotational axis.

DESCRIPTION OF EXEMPLARY EMBODIMENTS

Hereinafter, some preferred embodiments of a horizontal articulated robot, and a horizontal articulated robotic system according to the present disclosure will be described in detail based on the accompanying drawings.

First Embodiment

Figure 1:
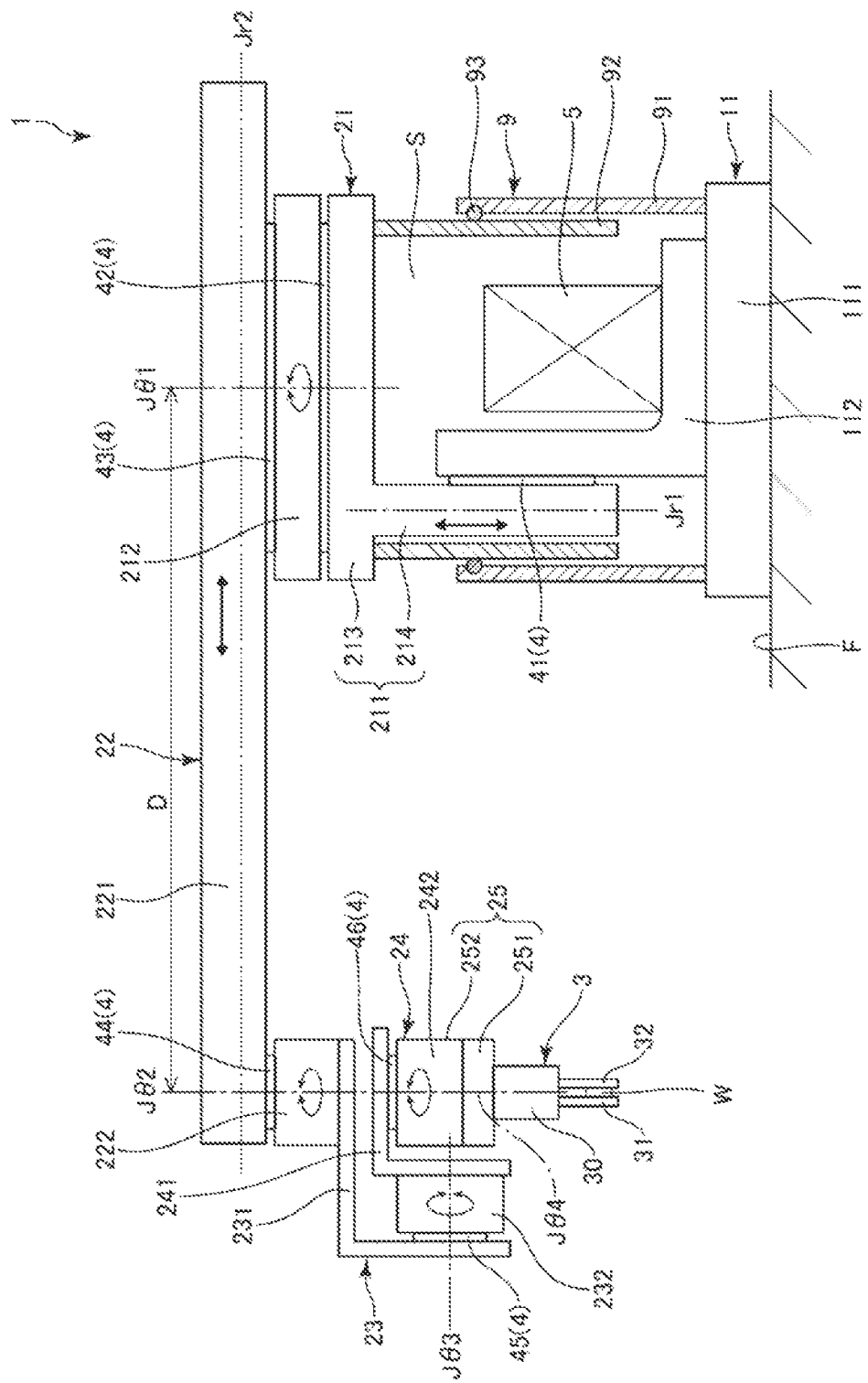
FIG. 1 is a side view showing a horizontal articulated robot according to a first embodiment.
Figure 2:
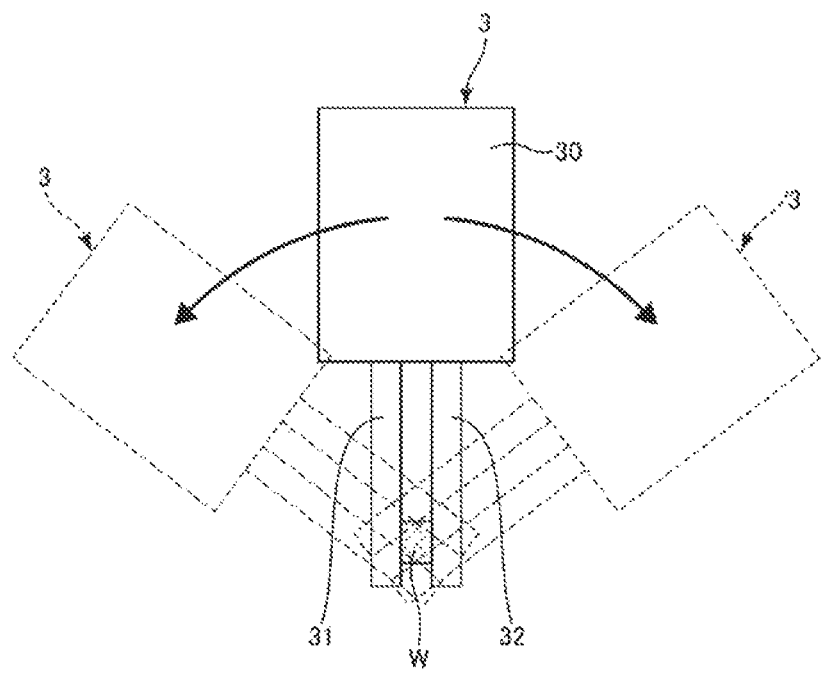
FIG. 2 is a schematic diagram showing a "eucentric motion" viewed from a vertical direction.
Figure 3:
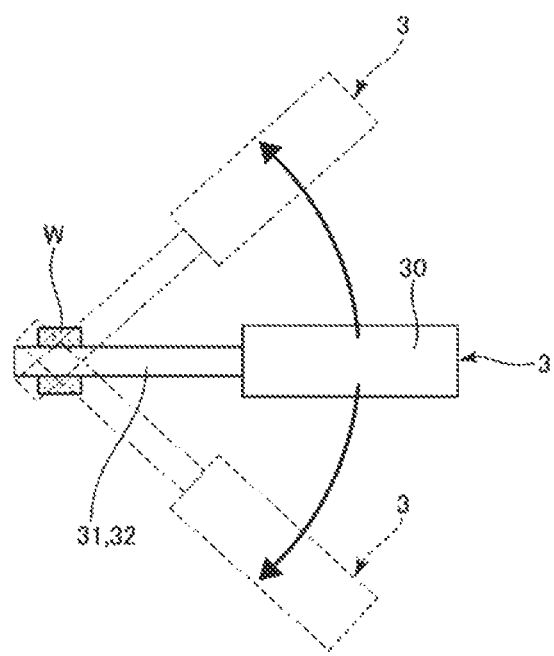
FIG. 3 is a schematic diagram showing the "eucentric motion" viewed from a horizontal direction.
Figure 4:
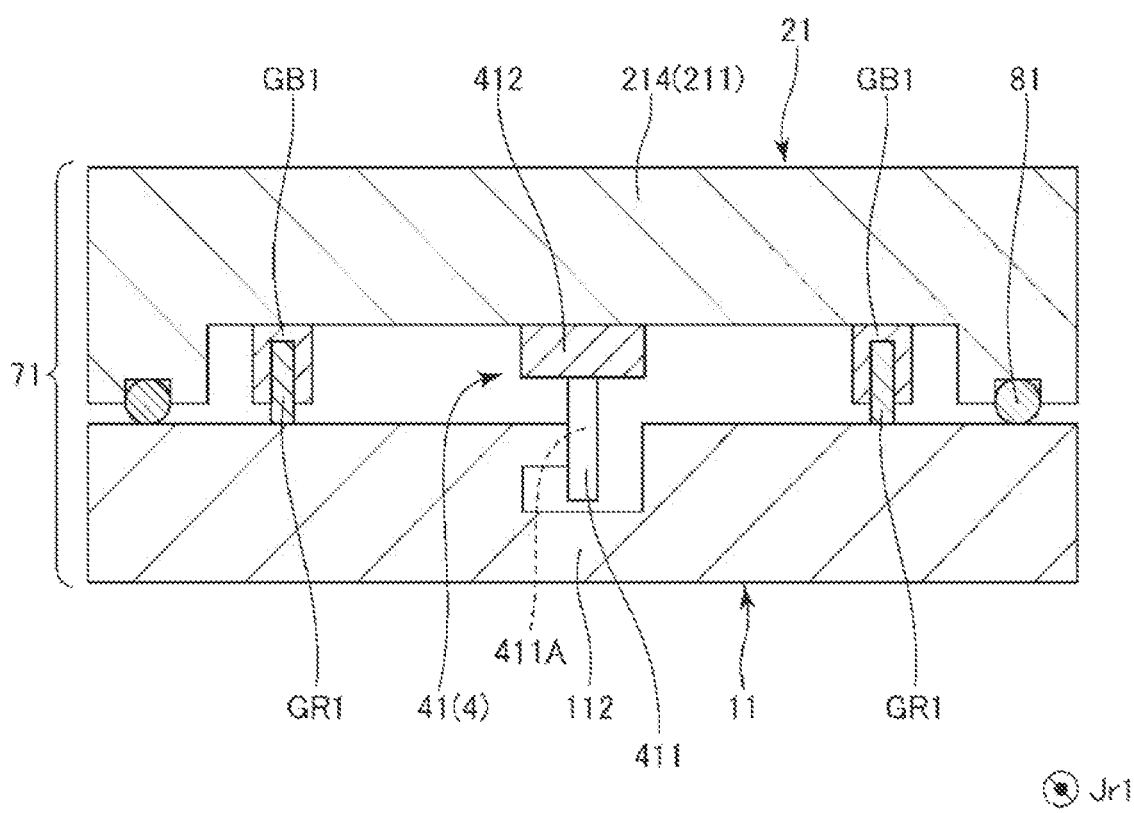
FIG. 4 is a cross-sectional view showing a first drive mechanism.
Figure 5:
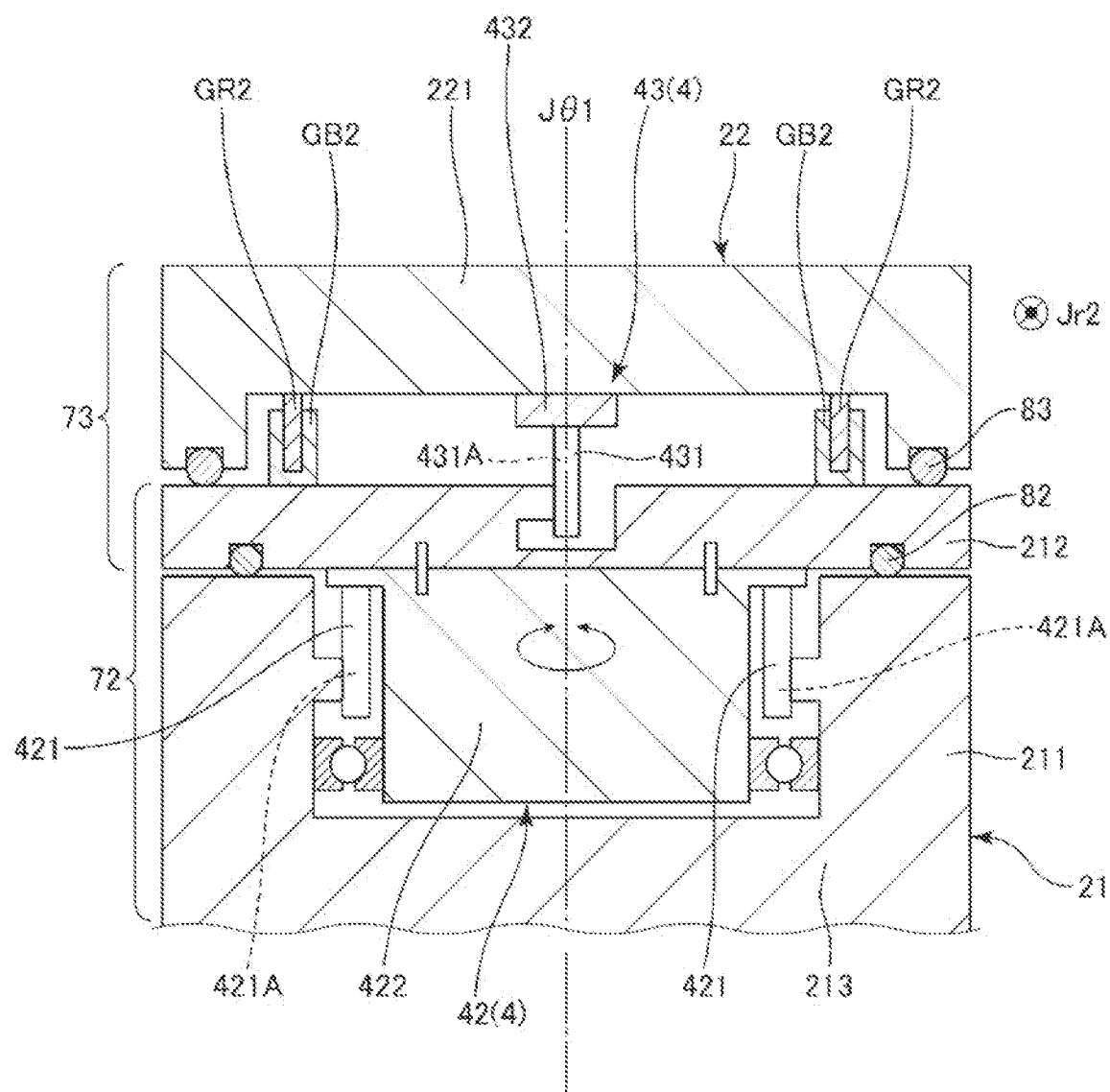
FIG. 5 is a cross-sectional view showing a second drive mechanism and a third drive mechanism.
Figure 6:
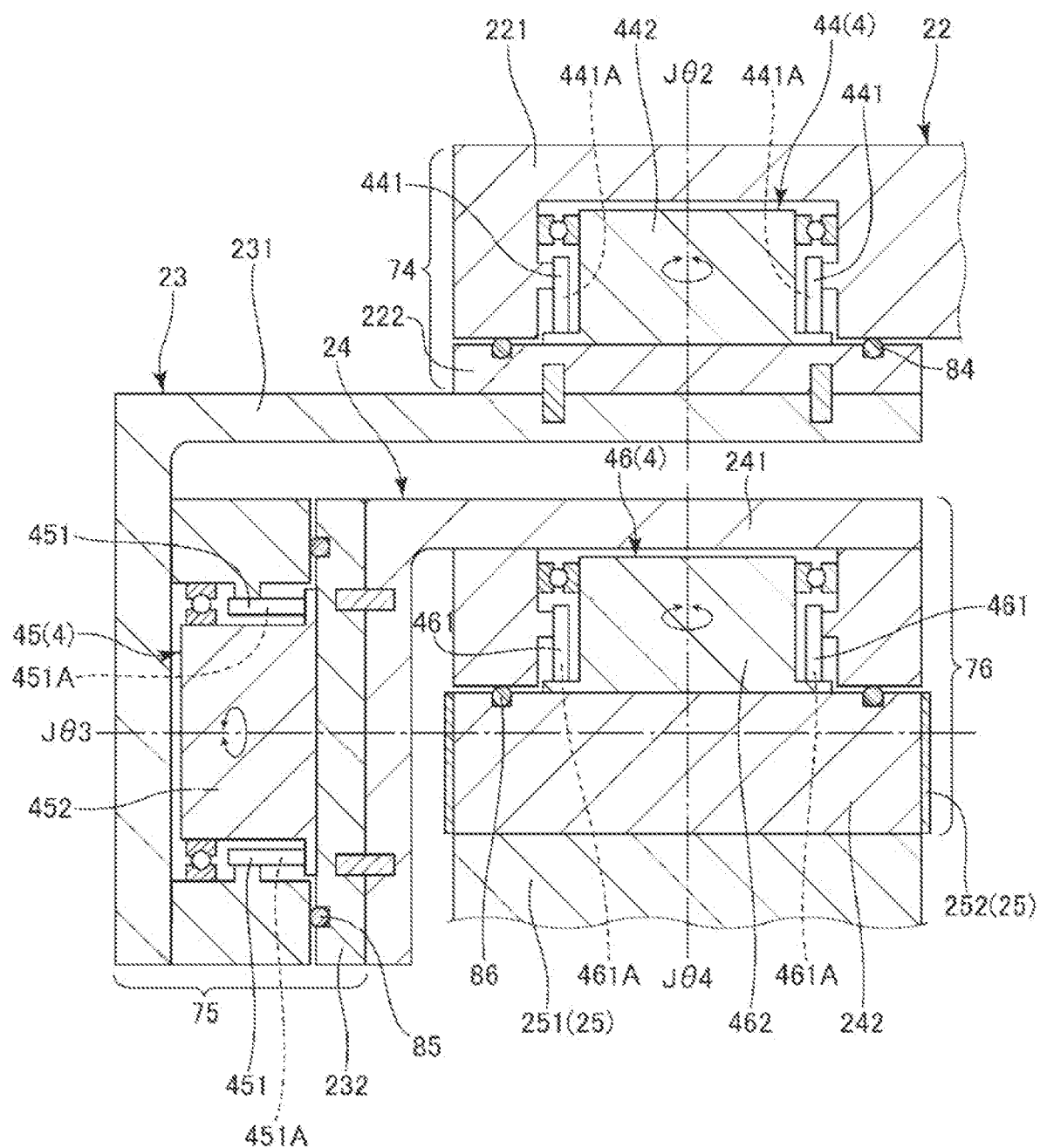
FIG. 6 is a cross-sectional view showing a fourth drive mechanism, a fifth drive mechanism, and a sixth drive mechanism.

FIG. 1 is a side view showing a horizontal articulated robot according to a first embodiment. FIG. 2 is a schematic diagram showing a "eucentric motion" viewed from a vertical direction. FIG. 3 is a schematic diagram showing the "eucentric motion" viewed from a horizontal direction. FIG. 4 is a cross-sectional view showing a first drive mechanism. FIG. 5 is a cross-sectional view showing a second drive mechanism and a third drive mechanism. FIG. 6 is a cross-sectional view showing a fourth drive mechanism, a fifth drive mechanism, and a sixth drive mechanism. It should be noted that the upper side of FIG. 1 is also referred to as "upper," and the lower side thereof is also referred to as "lower" in the following descriptions for the sake of convenience of explanation. Further, the term "parallel" includes a state in which the both parties are tilted from each other to the extent that the both parties can be identified to be parallel to each other in addition to when the both parties are completely parallel to each other. The same applies to the term "perpendicular."

The horizontal articulated robot 1 shown in FIG. 1 is a so-called scalar robot. The purpose of the horizontal articulated robot 1 is not particularly limited, but there can be cited, for example, feeding, removing, conveying, and assembling of precision mechanical equipment, a component constituting the precision mechanical equipment, and so on. It should be noted that the horizontal articulated robot 1 is hereinafter referred to simply as a "robot 1."

The robot 1 has a platform 11, a first arm 21 coupled to the platform 11, a second arm 22 coupled to the first arm 21, a third arm 23 coupled to the second arm 22, a fourth arm 24 coupled to the third arm 23, an end effector 3 coupled to the fourth arm 24 via a sensor 25, a drive mechanism 4 for driving each of these constituents, and a robot control device 5 for controlling the drive by the drive mechanism 4.

Further, the first arm 21 moves in a first linear-motion axis Jr1 direction with respect to the platform 11, and rotates around a first rotational axis Jθ1 parallel to the first linear-motion axis Jr1. Further, the second arm moves in a second linear-motion axis Jr2 direction perpendicular to the first linear-motion axis Jr1 with respect to the first arm 21, and rotates around a second rotational axis Jθ2 parallel to the first rotational axis J01. Further, the third arm 23 rotates around a third rotational axis J03 perpendicular to the first linear-motion axis Jr1 with respect to the second arm 22. Further, the fourth arm 24 rotates around a fourth rotational axis J04 perpendicular to the third rotational axis J03 with respect to the third arm 23.

Such a robot 1 moves the end effector 3 to a target position using a combination of the motions around the four rotational axes and the motions in the directions of the two linear-motion axes. Therefore, the robot 1 is larger in the number of movable axes compared to the related-art configuration in which motions around three rotational axes and a motion in a direction of one linear-motion axis are combined with each other, and accordingly, becomes difficult to be subject to the limitation of the motion of the end effector 3, and in particular, the limitation in the approach direction of the end effector 3 toward a work W. Therefore, it is difficult for the operation to be performed to be subject to the limitation, and there is obtained the robot 1 capable of performing a wide variety of operations corresponding to requests of the user.

Further, since it is difficult for the direction of the approach to the work W to be subject to the limitation, there is obtained the robot 1 suitable for a narrow-place operation in which the direction of the approach is apt to be limited. Further, when rotating the first arm 21 around the first rotational axis J01, by retracting the second arm 22 toward the base end in advance, it is possible to decrease the radius of rotation of the end effector 3. Therefore, even when being installed in a narrow place, it is difficult for the end effector 3 to interfere with an obstacle or the like. From this viewpoint, there is obtained the robot 1 suitable for a narrow-place operation.

In particular, according to the robot 1 having such a configuration, it is possible to easily perform the rotational locomotion of the end effector 3 centering on the tip of the end effector 3 or the work W gripped by the end effector 3 shown in FIG. 2 and FIG. 3. Therefore, there is obtained the robot 1 which is adept at an operation of changing only the posture of the work W while keeping the position of the work W, and which is suitable for an operation under a limited narrow visual field such as assembling of the work W or execution of the inspection of the work W under the visual field of a microscope 110 described later. It should be noted that such a motion is hereinafter also referred to as a "eucentric motion" in some cases for the sake of convenience of explanation.

Further, by making the first linear-motion axis Jr1 and the second linear-motion axis Jr2 perpendicular to each other, the motion of the robot becomes simpler, and accordingly, the control of each of the constituents becomes easy. It should be noted that this is not a limitation, but it is possible for the second linear-motion axis Jr2 to be tilted with respect to the first linear-motion axis Jr1.

It should be noted that the largest rotational angle around the first rotational axis J01 of the first arm 21, the largest rotational angle around the second rotational axis J02 of the second arm 22, the largest rotational angle around the third rotational axis J03 of the third arm 23, and the largest rotational angle around the fourth rotational axis J04 of the fourth arm 24 are not particularly limited, but are each preferably no smaller than ±90°, more preferably no smaller than ±135°, and further more preferably no smaller than ±180° from the state of the reference posture shown in FIG. 1. Thus, there is obtained the robot 1 which is sufficiently wide in movable range of each of the arms 21, 22, 23, and 24, and which can easily realize the eucentric motion described above.

As shown in FIG. 1, the platform 11 has a base part 111, and an arm part 112 disposed on the base part 111. The base part 111 is fixed to an installation target surface F. The arm part 112 has a columnar shape extending in a direction of the first linear-motion axis Jr1. Further, as shown in FIG. 4, on the side surface of the arm part 112, there is disposed a first guide rail GR1 extending in the direction of the first linear-motion axis Jr1. It should be noted that the installation target surface F is not particularly limited, but there can be cited, for example, a floor, a wall, a ceiling, a top of a table, and a top of a movable wagon. The installation target surface F is not required to be a horizontal surface, but can be, for example, a vertical surface, or can also be a tilted surface tilted with respect to the horizontal surface and the vertical surface. Therefore, the term "horizontal" in the robot 1 means that something is parallel to the installation target surface F.

As shown in FIG. 1, the first arm 21 has a first moving part 211 which moves in the direction of the first linear-motion axis Jr1 with respect to the platform 11, and the first rotating part 212 rotating around the first rotational axis J01 with respect to the first moving part 211. Further, the first moving part 211 is coupled to the platform 11, and the first rotating part 212 is coupled to the first moving part 211. Thus, the configuration of the first arm 21 becomes simple.

The first moving part 211 has a base part 213 shaped like a plate taking the direction of the first rotational axis J01 as the thickness direction, and an arm part 214 extending from the base part 213 toward the lower side. The base part 213 is disposed above the platform 11, specifically, so as to be opposed to the base part 111 across the arm parts 112, 214. Further, the arm part 214 is disposed so as to be opposed to the arm part 112 in the horizontal direction. Further, as shown in FIG. 4, a surface opposed to the arm part 112 of the arm part 214 is provided with a first guide block GB1, and the first guide block GB1 slidably engages with the first guide rail GR1. Thus, the first moving part 211 moves in the direction of the first linear-motion axis Jr1 while being guided by the first guide rail GR1.

As shown in FIG. 1, the first rotating part 212 is located above the base part 213, and is coupled to the base part 213 so as to be able to rotate around the first rotational axis J01. Further, as shown in FIG. 5, on the upper surface of the first rotating part 212, there is disposed a second guide block GB2 slidably engaged with the second guide rail GR2 described later.

Further, between the base parts 111, 213, there is disposed a case 9 shaped like a cylinder covering the arm parts 112, 214 located between the base parts 111, 213. Further, in a space S formed inside the case 9, there are disposed electronic components such as the robot control device 5 and a power supply. Thus, it is possible to effectively utilize the space S. It should be noted that it is possible for the robot control device 5, the power supply, and so on to be disposed outside the case 9.

The case 9 expands and contracts in accordance with the locomotion of the first arm 21 toward the direction of the first linear-motion axis Jr1. Specifically, the case 9 has an outer case 91 fixed to the base part 111 in the lower end part, and an inner case 92 which is disposed inside the outer case 91, and which is fixed to the base part 213 in the upper end part. Further, between the outer case 91 and the inner case 92, there is disposed a seal member 93, and the space S is sealed in an airtight manner and in a liquid-tight manner.

Thus, it is possible to effectively protect the robot control device 5 disposed in the space S from an external environment, in particular, moisture, dust, and so on. It should be noted that the configuration of the case 9 is not particularly limited, and it is possible to omit, for example, the seal member 93. Further, it is possible to provide the case 9 with an accordion shape which can expand and contract. Further, the case 9 can be omitted.

As shown in FIG. 1, the second arm 22 has a second moving part 221 which moves in a direction of the second linear-motion axis Jr2 with respect to the first arm 21, and the second rotating part 222 rotating around the second rotational axis J$\theta$2 with respect to the second moving part 221. Further, the second moving part 221 is coupled to the first rotating part 212, and the second rotating part 222 is coupled to the second moving part 221. Thus, the configuration of the second arm 22 becomes simple.

The second moving part 221 has an elongated shape extending in the direction of the second linear-motion axis Jr2. Further, as shown in FIG. 5, on the lower surface of the second moving part 221, there is disposed the second guide rail GR2 extending along the second linear-motion axis Jr2, and the second guide rail GR2 is slidably engaged with the second guide block GB2. Therefore, the second moving part 221 moves in the direction of the second linear-motion axis Jr2 while being guided by the second guide rail GR2. It should be noted that the second linear-motion axis Jr2 is perpendicular to the first rotational axis J$\theta$1, and rotates around the first rotational axis J$\theta$1 due to the rotation of the first rotating part 212 around the first rotational axis J$\theta$1.

As shown in FIG. 1, the first rotating part 222 is located in a tip part of the second moving part 221, and is coupled to the second moving part 221 so as to be able to rotate around the second rotational axis J$\theta$2. It should be noted that the second rotational axis J$\theta$2 is parallel to the first rotational axis J$\theta$1, and due to the locomotion of the second moving part 221 toward the second linear-motion axis Jr2, the distance D from the first rotational axis J$\theta$1 varies.

As shown in FIG. 1, the third arm 23 has an arm part 231 coupled to the second rotating part 222, and a third rotating part 232 coupled to the arm part 231 so as to be able to rotate around the third rotational axis J$\theta$3. Further, the arm part 231 forms a substantially L-shape bending at a substantially right angle in the middle thereof, and has a base end part to which the second rotating part 222 is coupled, and a tip part to which the third rotating part 232 is coupled. Further, the third rotating part 232 is disposed so as to be shifted in a horizontal direction from the second rotating part 222 without overlapping the second rotating part 222 in a plan view along the second rotational axis J$\theta$2. It should be noted that the third rotational axis J$\theta$3 is perpendicular to the second rotational axis J$\theta$2, and rotates around the second rotational axis J$\theta$2 due to the rotation of the second rotating part 222 around the second rotational axis J$\theta$2.

As shown in FIG. 1, the fourth arm 24 has an arm part 241 coupled to the third rotating part 232, and a fourth rotating part 242 coupled to the arm part 241 so as to be able to rotate around the fourth rotational axis J$\theta$4. Further, the arm part 241 forms a substantially L-shape bending at a substantially right angle in the middle thereof, and has a base end part to which the third rotating part 232 is coupled, and a tip part to which the fourth rotating part 242 is coupled. It should be noted that the fourth rotational axis J$\theta$4 is perpendicular to the third rotational axis J$\theta$3, and rotates around the third rotational axis J$\theta$3 due to the rotation of the third rotating part 232 around the third rotational axis J$\theta$3.

Further, the fourth rotating part 242 is arranged side by side with the second rotating part 222 in the direction of the second rotational axis J$\theta$2. Further, the fourth rotating part 242 is arranged side by side with the third rotating part 232 in the direction of the third rotational axis J$\theta$3. Thus, it is easy to shorten the distance from the second rotational axis J$\theta$2 to the tip of the end effector 3 in a posture which is achieved by rotating the third rotating part 232 around the third rotational axis J$\theta$3 from the posture shown in FIG. 1, and in which the tip of the end effector 3 faces to the horizontal direction. Therefore, it is possible to improve the positional accuracy of the end effector 3 when rotating around the second rotational axis J$\theta$2. Further, it is easy to shorten the distance from the third rotational axis J$\theta$3 to the tip of the end effector 3. Therefore, it is possible to improve the positional accuracy of the end effector 3 when rotating around the third rotational axis J$\theta$3. In particular, in the present embodiment, the fourth rotating part 242 is located on the second rotational axis J$\theta$2 and the third rotational axis J$\theta$3 at any posture. Thus, the advantage described above becomes more conspicuous.

As shown in FIG. 1, the sensor 25 detects a contact between the robot 1 and an object and approach of an object to the robot 1. The sensor 25 has a kinesthetic sensor 251 for detecting the contact between the robot 1 and an object, a proximity sensor 252 for detecting approach of an object to the robot 1, and a vision sensor not shown.

The kinesthetic sensor 251 is disposed between the fourth rotating part 242 and the end effector 3, and detects a force applied to the end effector 3. Therefore, it is possible to detect a gripping state of the work W by the end effector 3, and a contact between the end effector 3 and an object such as another robot, a structure such as a wall or a ceiling, or a coexisting operator based on an output of the kinesthetic sensor 251. Therefore, it is possible to more accurately drive the robot 1. Although not shown in the drawings, the kinesthetic sensor 251 has a pressure receiving section which is formed of a piezoelectric body such as quartz crystal, and to which the stress applied to the end effector 3 is transmitted, and electrodes provided to the pressure receiving section, and has a configuration in which the charge generated in the pressure receiving section in accordance with the stress received is taken out from the electrodes as a detection signal. Thus, there is obtained the kinesthetic sensor 251 which has a relatively simple configuration, and which is high in detection accuracy.

It should be noted that the configuration of the kinesthetic sensor 251 is not particularly limited as long as the stress applied to the end effector 3 can be detected. Further, the arrangement of the kinesthetic sensor 251 is not particularly limited as long as the stress applied to the end effector 3 can be detected, and the kinesthetic sensor 251 can be disposed, for example, between the end effector 3, the third arm 23 and the fourth arm 24, between the second arm 22 and the third arm 23, between the first arm 21 and the second arm 22, or the like. Further, the number of the kinesthetic sensors 251 is not particularly limited, but can be two or more. Further, the kinesthetic sensor 251 can be omitted.

The proximity sensor 252 is disposed on a side surface of the fourth rotating part 242, and detects approach of an object to the robot 1. Thus, it is possible to make the robot 1 make an avoidance action of avoiding contact with an object or keeping an impact or a damage caused by the contact at the minimum before making contact with the object around the robot 1. Therefore, the robot 1 is made safe. Therefore, it is possible to use the robot 1 in good condition as, for example, a human-coexistence robot which coexists with an operator. Although not shown in the drawings, the proximity sensor 252 has a pair of electrodes different in potential from each other and provided with a capacitance formed therebetween, and has a configuration in which a change in capacitance caused by approach of an object is taken out as the detection signal. Thus, there is obtained the proximity sensor 252 which has a relatively simple configuration, and which is high in detection accuracy.

It should be noted that the configuration of the proximity sensor 252 is not particularly limited as long as approach of an object to the robot 1 can be detected. Further, the arrangement of the proximity sensor 252 is not particularly limited as long as approach of an object to the robot 1 can be detected, but it is preferable for the proximity sensor 252 to be provided to each of the first arm 21, the second arm 22, the third arm 23, and the fourth arm 24. Thus, it is possible to detect the approach of the object throughout a broader range. Further, the proximity sensor 252 can be omitted.

The vision sensor is provided with a camera. Further, the camera is disposed immediately above the robot 1, and takes an image of an area including the robot 1. Then, contact between the robot 1 and the object around the robot 1, and approach of the object to the robot 1 are detected based on the image taken by the camera. Further, it is also possible to detect an object around from the image taken by the camera to limit the movable area of each of the arms 21, 22, 23, and 24 so that the contact with the object is avoided. Thus, the robot 1 is made safe. Therefore, it is possible to use the robot 1 in good condition as, for example, a human-coexistence robot which coexists with an operator.

As shown in FIG. 1, the end effector 3 is coupled to the fourth rotating part 242 via the kinesthetic sensor 251. The end effector 3 is a mechanism for making the robot execute a predetermined operation, and can be any configuration such as a mechanism of gripping the work W, a mechanism of suctioning the work W, or a mechanism of applying an adhesive or the like to the work W. The end effector 3 in the present embodiment is a mechanism of gripping the work W, and has a base part 30, and a pair of claw parts 31, 32 coupled to the base part 30. According to the end effector 3 having such a configuration, it is possible to grip the work W by making the tip portions of the pair of claw parts 31, 32 come closer to each other, and it is possible to release the work W once gripped by making the tip portions of the pair of claw parts 31, 32 get away from each other.

As shown in FIG. 1, the drive mechanism 4 has a first drive mechanism 41 for moving the first moving part 211 in the direction of the first linear-motion axis Jr1 with respect to the platform 11, a second drive mechanism 42 for rotating the first rotating part 212 around the first rotational axis Jθ1 with respect to the first moving part 211, a third drive mechanism 43 for moving the second moving part 221 in the direction of the second linear-motion axis Jr2 with respect to the first rotating part 212, a fourth drive mechanism 44 for rotating the second rotating part 222 around the second rotational axis Jθ2 with respect to the second moving part 221, a fifth drive mechanism 45 for rotating the third rotating part 232 around the third rotational axis Jθ3 with respect to the second rotating part 222, and a sixth drive mechanism 46 for rotating the fourth rotating part 242 around the fourth rotational axis Jθ4 with respect to the third rotating part 232.

As shown in FIG. 4, the first drive mechanism 41 has a piezoelectric actuator 411, a driven part 412 which is displaced in response to a drive force from the piezoelectric actuator 411, and an encoder not shown for detecting an amount of displacement of the driven part 412. The driven part 412 is an elongated body extending along the first linear-motion axis Jr1, and is fixed to the first moving part 211. The piezoelectric actuator 411 is biased toward the driven part 412, and is supported by the arm part 112 in a state of being pressed against the driven part 412. Further, the piezoelectric actuator 411 includes a piezoelectric element 411A, and vibrates the piezoelectric element 411A due to energization to thereby generate a drive force for feeding the driven part 412 in the direction of the first linear-motion axis Jr1. Thus, the first arm 21 moves along the first linear-motion axis Jr1.

Further, between the first moving part 211 and the arm part 112, there is disposed a first seal member 81 having contact with the first moving part 211 and the arm part 112, and the first moving part 211, the arm part 112, and the first seal member 81 constitute a first cover part 71 which covers the first drive mechanism 41 in an airtight manner and in a liquid-tight manner. Thus, it is possible to effectively prevent flying of abrasion powder generated by friction between the piezoelectric actuator 411 and the driven part 412 and infiltration of a liquid from the outside.

As shown in FIG. 5, the second drive mechanism 42 has a piezoelectric actuator 421, a driven part 422 which is displaced in response to a drive force from the piezoelectric actuator 421, and an encoder not shown for detecting an amount of displacement of the driven part 422.

The driven part 422 is a rotor shaped like a disk, and is bearing-supported by the first moving part 211 so as to be able to rotate around the first rotational axis Jθ1. Further, the first rotating part 212 is fixed to the driven part 422. It should be noted that it is possible for the driven part 422 to also function as the first rotating part 212. The piezoelectric actuator 421 is biased toward the driven part 422, and is supported by the first moving part 211 in a state of being pressed against the driven part 422. Further, the piezoelectric actuator 421 includes a piezoelectric element 421A, and vibrates the piezoelectric element 421A due to energization to thereby generate a drive force for feeding the driven part 422 around the first rotational axis Jθ1. Thus, the first rotating part 212 rotates around the first rotational axis Jθ1.

Further, between the first moving part 211 and the first rotating part 212, there is disposed a second seal member 82 having contact with the first moving part 211 and the first rotating part 212, and the first moving part 211, the first rotating part 212, and the second seal member 82 constitute a second cover part 72 which covers the second drive mechanism 42 in an airtight manner and in a liquid-tight manner. Thus, it is possible to effectively prevent flying of abrasion powder generated by friction between the piezoelectric actuator 421 and the driven part 422 and infiltration of a liquid from the outside.

The third drive mechanism 43 has substantially the same configuration as that of the first drive mechanism 41. As shown in FIG. 5, the third drive mechanism 43 has a piezoelectric actuator 431, a driven part 432 which is displaced in response to a drive force from the piezoelectric actuator 431, and an encoder not shown for detecting an amount of displacement of the driven part 432.

The driven part 432 is an elongated body extending along the second linear-motion axis Jr2, and is fixed to a lower surface of the second moving part 221. The piezoelectric actuator 431 is biased toward the driven part 432, and is supported by the first rotating part 212 in a state of being pressed against the driven part 432. The piezoelectric actuator 431 includes a piezoelectric element 431A, and vibrates the piezoelectric element 431A due to energization to thereby generate a drive force for feeding the driven part 432 in the direction of the second linear-motion axis Jr2. Thus, the second arm 22 moves in the direction of the second linear-motion axis Jr2.

Further, between the first rotating part 212 and the second moving part 221, there is disposed a third seal member 83 having contact with the first rotating part 212 and the second moving part 221, and the first rotating part 212, the second moving part 221, and the third seal member 83 constitute a third cover part 73 which covers the third drive mechanism 43 in an airtight manner and in a liquid-tight manner. Thus, it is possible to effectively prevent flying of abrasion powder generated by friction between the piezoelectric actuator 431 and the driven part 432 and infiltration of a liquid from the outside.

The fourth drive mechanism 44 has substantially the same configuration as that of the second drive mechanism 42. As shown in FIG. 6, the fourth drive mechanism 44 has a piezoelectric actuator 441, a driven part 442 which is displaced in response to a drive force from the piezoelectric actuator 441, and an encoder not shown for detecting an amount of displacement of the driven part 442.

The driven part 442 is a rotor shaped like a disk, and is bearing-supported by the second moving part 221 so as to be able to rotate around the second rotational axis J$\theta$2. Further, the second rotating part 222 is fixed to the driven part 442. It should be noted that the driven part 442 can be a part of the second rotating part 222, or it is possible for the driven part 442 and the second rotating part 222 to integrally be formed. The piezoelectric actuator 441 is biased toward the driven part 442, and is supported by the second moving part 221 in a state of being pressed against the driven part 442. Further, the piezoelectric actuator 441 includes a piezoelectric element 441A, and vibrates the piezoelectric element 441A due to energization to thereby generate a drive force for feeding the driven part 442 around the second rotational axis J$\theta$2. Thus, the second rotating part 222 rotates around the second rotational axis J$\theta$2.

Further, between the second moving part 221 and the second rotating part 222, there is disposed a fourth seal member 84 having contact with the second moving part 221 and the second rotating part 222, and the second moving part 221, the second rotating part 222, and the fourth seal member 84 constitute a fourth cover part 74 which covers the fourth drive mechanism 44 in an airtight manner and in a liquid-tight manner. Thus, it is possible to effectively prevent flying of abrasion powder generated by friction between the piezoelectric actuator 441 and the driven part 442 and infiltration of a liquid from the outside.

The fifth drive mechanism 45 has substantially the same configuration as that of the second drive mechanism 42. As shown in FIG. 6, the fifth drive mechanism 45 has a piezoelectric actuator 451, a driven part 452 which is displaced in response to a drive force from the piezoelectric actuator 451, and an encoder not shown for detecting an amount of displacement of the driven part 452.

The driven part 452 is a rotor shaped like a disk, and is bearing-supported by the arm part 231 so as to be able to rotate around the third rotational axis J$\theta$3. Further, the third rotating part 232 is fixed to the driven part 452. It should be noted that the driven part 452 can be a part of the third rotating part 232, or it is possible for the driven part 452 and the third rotating part 232 to integrally be formed. The piezoelectric actuator 451 is biased toward the driven part 452, and is supported by the arm part 231 in a state of being pressed against the driven part 452. Further, the piezoelectric actuator 451 includes a piezoelectric element 451A, and vibrates the piezoelectric element 451A due to energization to thereby generate a drive force for feeding the driven part 452 around the third rotational axis J$\theta$3. Thus, the third rotating part 232 rotates around the third rotational axis J$\theta$3.

Further, between the arm part 231 and the third rotating part 232, there is disposed a fifth seal member 85 having contact with the arm part 231 and the third rotating part 232, and arm part 231, the third rotating part 232, and the fifth seal member 85 constitute a fifth cover part 75 which covers the fifth drive mechanism 45 in an airtight manner and in a liquid-tight manner. Thus, it is possible to effectively prevent flying of abrasion powder generated by friction between the piezoelectric actuator 451 and the driven part 452 and infiltration of a liquid from the outside.

The sixth drive mechanism 46 has substantially the same configuration as that of the second drive mechanism 42. As shown in FIG. 6, the sixth drive mechanism 46 has a piezoelectric actuator 461, a driven part 462 which is displaced in response to a drive force from the piezoelectric actuator 461, and an encoder not shown for detecting an amount of displacement of the driven part 462.

The driven part 462 is a rotor shaped like a disk, and is bearing-supported by the arm part 241 so as to be able to rotate around the fourth rotational axis J$\theta$4. Further, the fourth rotating part 242 is fixed to the driven part 462. It should be noted that the driven part 462 can be a part of the fourth rotating part 242, or it is possible for the driven part 462 and the fourth rotating part 242 to integrally be formed. The piezoelectric actuator 461 is biased toward the driven part 462, and is supported by the arm part 241 in a state of being pressed against the driven part 462. Further, the piezoelectric actuator 461 includes a piezoelectric element 461A, and vibrates the piezoelectric element 461A due to energization to thereby generate a drive force for feeding the driven part 462 around the fourth rotational axis J$\theta$4. Thus, the fourth rotating part 242 rotates around the fourth rotational axis J$\theta$4.

Further, between the arm part 241 and the fourth rotating part 242, there is disposed a sixth seal member 86 having contact with the arm part 241 and the fourth rotating part 242, and the arm part 241, the fourth rotating part 242, and the sixth seal member 86 constitute a sixth cover part 76 which covers the sixth drive mechanism 46 in an airtight manner and in a liquid-tight manner. Thus, it is possible to effectively prevent flying of abrasion powder generated by friction between the piezoelectric actuator 461 and the driven part 462 and infiltration of a liquid from the outside.

As described above, the drive mechanisms 41, 42, 43, 44, 45, and 46 are of a piezoelectric type using the piezoelectric elements 411A, 421A, 431A, 441A, 451A, and 461A, respectively. Therefore, the drive forces from the piezoelectric actuators 411, 421, 431, 441, 451, and 461 are transmitted directly to the driven parts 412, 422, 432, 442, 452, and 462, respectively. In other words, it is possible to achieve simplification and reduction in size of a structure of each of the drive mechanisms 41, 42, 43, 44, 45, and 46 without requiring a relay mechanism for relaying and transmitting the drive force. Further, the deterioration in accuracy of the robot 1 due to the backlash or lack of rigidity which present problems in the relay mechanism such as a reduction gear substantively vanishes, and thus, the robot 1 excellent in accuracy is obtained.

In particular, by adopting the piezoelectric type as the sixth drive mechanism 46 located the closest to the end effector 3, it is possible to achieve reduction in size of the tip portion of the robot 1, and it becomes difficult for the robot 1 to interfere with an obstacle around when the end effector 3 approaches the work W. Therefore, there is obtained the robot 1 suitable for a narrow-place operation. It should be noted that the drive mechanisms 41, 42, 43, 44, 45, and 46 are not particularly limited, but at least one of the drive mechanisms can be provided with a relay mechanism, or can be of an electromagnetic type using an electromagnetic motor or another type.

Further, as described above, the drive mechanisms 41, 42, 43, 44, 45, and 46 are respectively provided with the cover parts 71, 72, 73, 74, 75, and 76 for preventing the abrasion powder from flying. Therefore, it is possible to prevent the abrasion powder from adhering to the end effector 3 and the work W to hinder the operation by the robot 1, or to cause deterioration of quality and damage of the work W. In particular, by providing the sixth cover part 76 which covers the sixth drive mechanism 46 the closest to the end effector 3, the advantage described above becomes conspicuous. Further, it is possible to prevent the infiltration of a liquid from the outside, and thus, it is possible to protect the drive mechanisms 41, 42, 43, 44, 45, and 46 from the liquid. Therefore, more stable drive becomes possible. Further, there is obtained the robot 1 suitable for an operation having a possibility of making contact with a liquid.

It should be noted that the robot 1 is not limited to the above, it is possible to omit at least one of the cover parts 71, 72, 73, 74, 75, and 76. Further, the robot 1 can be provided with collection mechanisms for collecting the abrasion powder instead of or in addition to the cover parts 71, 72, 73, 74, 75, and 76. Thus, the abrasion powder is prevented form flying, and it is possible to prevent a decrease in the driving stability due to adhesion of the abrasion powder to the drive mechanisms 41, 42, 43, 44, 45, and 46. Therefore, there is obtained the robot 1 capable of performing control higher in accuracy. It should be noted that the collection mechanism is not particularly limited, but can be formed of, for example, a configuration of suctioning the abrasion powder with an aspiration nozzle, a configuration of adsorbing the abrasion powder to an adsorption plate with static electricity, or a configuration provided with a collection storage attached with a check valve for collecting and retaining the abrasion powder.

Further, it is preferable for the robot 1 to have chemical resistance. Specifically, it is preferable for a portion having a possibility of making contact with a chemical during the operation such as the fourth arm 24 to have a surface formed of a material having durability and corrosion resistance to the chemical to handle, or a configuration of being covered with a chassis formed of such a material. It should be noted that the material having the chemical resistance is not particularly limited, but there can be cited, although it depends on the chemical to handle, for example, a variety of types of metal materials such as aluminum and stainless steel, nonmetallic materials such as carbon, alumina, tungsten carbide, and silicon carbide, and resin materials such as vinyl chloride, ABS, polyethylene, and polypropylene.

The robot control device 5 receives a position command for the robot 1 from a host computer not shown, and controls the drive mechanisms 41 through 46 independently of each other based on the position command. Such a robot control device 5 is formed of, for example, a computer, and has a processor for processing information, a memory coupled to the processor so as to be able to communicate with the processor, and an external interface. Further, the memory stores a variety of programs which can be executed by the processor, and the processor is capable of retrieving and then executing the variety of programs stored in the memory.

The robot 1 is hereinabove described. As described above, such a robot 1 has the platform 11, the first arm 21 which is coupled to the platform 11, moves along the first linear-motion axis $Jr1$ with respect to the platform 11, and rotates around the first rotational axis $J\theta 1$ parallel to the first linear-motion axis $Jr1$, the second arm 22 which is coupled to the first arm 21, moves along the second linear-motion axis $Jr2$ different in direction from the first linear-motion axis $Jr1$ with respect to the first arm 21, and rotates around the second rotational axis $J\theta 2$ parallel to the first rotational axis $J\theta 1$, the third arm 23 which is coupled to the second arm 22 and rotates around the third rotational axis $J\theta 3$ perpendicular to the first linear-motion axis $Jr1$, and the fourth arm 24 which is coupled to the third arm 23, and rotates around the fourth rotational axis $J\theta 4$ perpendicular to the third rotational axis $J\theta 3$.

Thus, by combining motions around the four rotational axes and motions in the directions of the two linear-motion axes with each other, the end effector 3 is moved to the target position. Therefore, the number of movable axes is larger compared to the related-art configuration in which motions around three rotational axes and a motion in a direction of one linear-motion axis are combined with each other, and accordingly, it becomes difficult to be subject to the limitation of the motion of the end effector 3, and in particular, the limitation in the direction in which the end effector 3 can approach the work W. Therefore, it is difficult for the operation to be performed to be subject to the limitation, and there is obtained the robot 1 capable of performing a wide variety of operations corresponding to requests of the user. In particular, according to the robot 1 having such a configuration, it is also possible to easily realize the eucentric motion. Further, the direction of the approach is difficult to be subject to the limitation, and accordingly, there is obtained the robot 1 suitable for a narrow-place operation in which the direction of the approach is apt to be limited. Further, when moving around the first rotational axis $J\theta 1$, by retracting the second arm 22 toward the base end in advance, it is possible to decrease the radius of rotation of the end effector 3. Therefore, even when being installed in a narrow place, it is difficult for the end effector 3 to interfere with an obstacle or the like. From this viewpoint, there is obtained the robot 1 suitable for a narrow-place operation.

Further, as described above, the first linear-motion axis $Jr1$ and the second linear-motion axis $Jr2$ are perpendicular to each other. Thus, the motion of the robot 1 becomes simpler, and accordingly, the control of each constituent becomes easy.

Further, as described above, the first arm 21 has the first moving part 211 which moves along the first linear-motion axis $Jr1$ with respect to the platform 11, and the first rotating part 212 rotating around the first rotational axis $J\theta 1$ with respect to the first moving part 211. Further, the first moving part 211 is coupled to the platform 11, the first rotating part 212 is coupled to the first moving part 211, and the second arm 22 is coupled to the first rotating part 212. Thus, the configuration of the first arm 21 becomes simple.

Further, as described above, the second arm 22 has a second moving part 221 which moves along the second linear-motion axis $Jr2$ with respect to the first arm 21, and the second rotating part 222 rotating around the second rotational axis $J\theta 2$ with respect to the second moving part 221. Further, the second moving part 221 is coupled to the first arm 21, and the second rotating part 222 is coupled to the second moving part 221. Thus, the configuration of the second arm 22 becomes simple.

Further, as described above, the second arm 22 has the second rotating part 222 rotating around the second rotational axis $J\theta 2$ with respect to the first arm 21. Further, the third arm 23 has the third rotating part 232 which rotates around the third rotational axis J03 with respect to the second arm 22. Further, the fourth arm 24 has the fourth rotating part 242 which rotates around the fourth rotational axis J04 with respect to the third arm 23. Further, the second rotating part 222 and the fourth rotating part 242 are arranged side by side in the direction of the second rotational axis J02, and the third rotating part 232 and the fourth rotating part 242 are arranged side by side in the direction of the third rotational axis J03. Thus, it is easy to shorten the distance from the second rotational axis J02 to the tip of the end effector 2. Therefore, it is possible to improve the positional accuracy of the end effector 3 when rotating around the second rotational axis J02. Further, it is easy to shorten the distance from the third rotational axis J03 to the tip of the end effector 3. Therefore, it is possible to improve the positional accuracy of the end effector 3 when rotating around the third rotational axis J03.

Further, as described above, the robot 1 has the sixth drive mechanism 46 as a drive mechanism for rotating the fourth arm 24 around the fourth rotational axis J04 with respect to the third arm 23. Further, the sixth drive mechanism 46 has the piezoelectric actuator 461 as the drive source provided with the piezoelectric element 461A. Thus, it is possible to achieve the reduction in size of the sixth drive mechanism 46.

Further, as described above, the robot 1 has the sixth cover part 76 as the cover part for covering the sixth drive mechanism 46. Therefore, it is possible to effectively prevent the abrasion powder from adhering to the end effector 3 and the work W to hinder the operation by the robot 1, or to cause deterioration of quality and damage of the work W.

Further, as described above, the robot 1 has the sensor 25 for detecting approach or contact of an object. Thus, the robot 1 is made safe.

Second Embodiment

Figure 7:
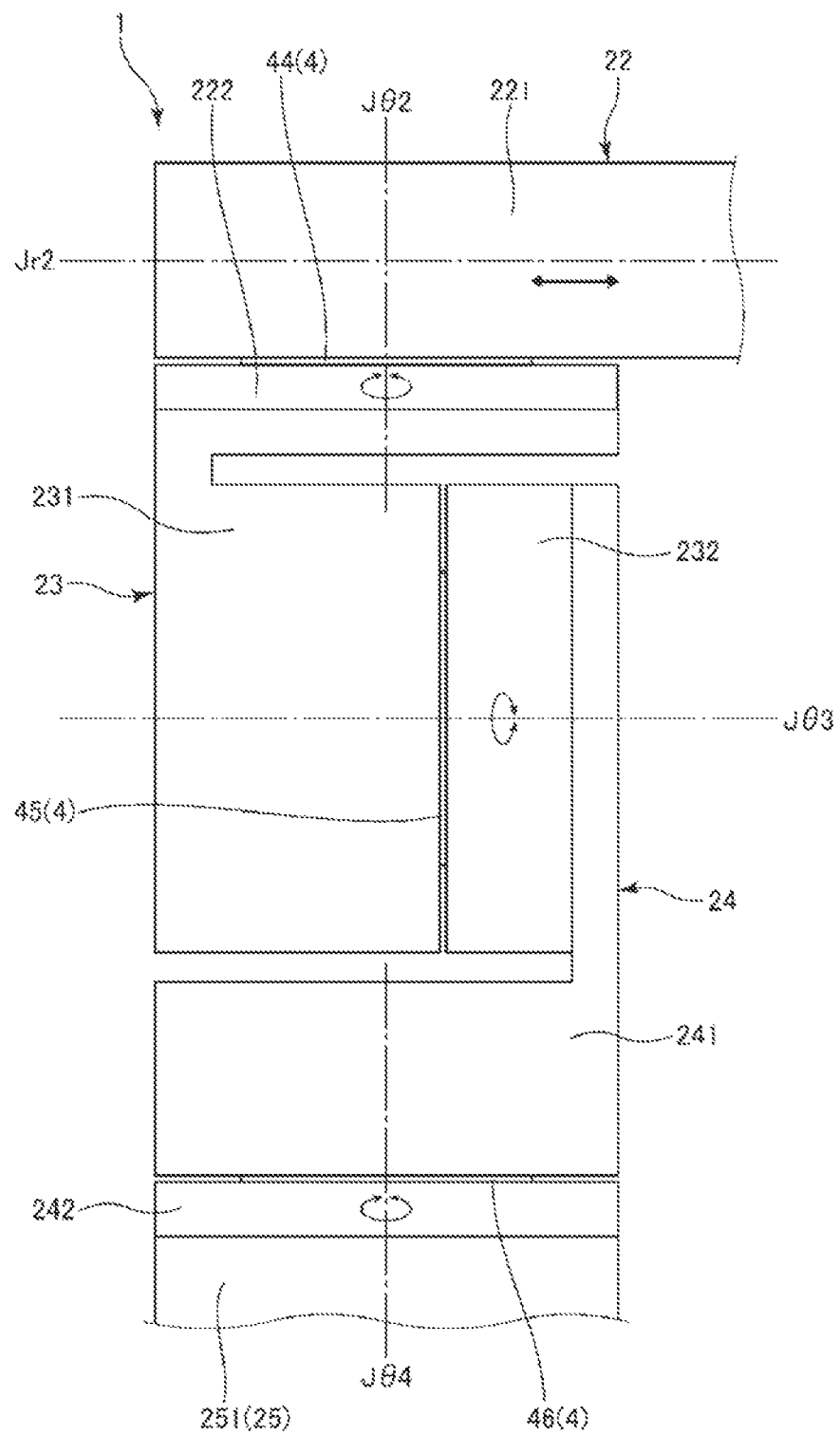
FIG. 7 is a plan view showing a tip portion of a horizontal articulated robot according to a second embodiment of the present disclosure.

FIG. 7 is a plan view showing a tip portion of a horizontal articulated robot according to a second embodiment of the present disclosure.

The robot 1 according to the present embodiment is substantially the same as the robot 1 according to the first embodiment described above except the point that the arrangement of the third arm 23 and the fourth arm 24 is different. Therefore, in the following description, the robot 1 according to the second embodiment will be described with a focus on the difference from the first embodiment described above, and the description of substantially the same issues will be omitted. Further, in FIG. 6, the constituents substantially the same as in the embodiment described above are denoted by the same reference symbols.

As shown in FIG. 7, in the robot 1 according to the present embodiment, the second rotating part 222, the third rotating part 232, and the fourth rotating part 242 are arranged in a line in the vertical direction. In other words, the third rotating part 232 is arranged in the direction of the second rotational axis J02 side by side with the second rotating part 222, and the fourth rotating part 242 is arranged in the direction of the fourth rotational axis J04 side by side with the third rotating part 232. Thus, it is possible to elongate the tip portion of the robot 1 including the third arm 23 and the fourth arm 24 in the vertical direction compared to, for example, the configuration in the first embodiment described above. Therefore, it becomes easy to perform an operation in a narrow place where there is a limitation in the horizontal direction. In particular, in the present embodiment, the third rotating part 232 is located on the second rotational axis J02 and the fourth rotational axis J04 at any posture. Thus, the advantage described above becomes more conspicuous.

As described above, in the robot 1 according to the present embodiment, the second arm 22 has the second rotating part 222 rotating around the second rotational axis J02 with respect to the first arm 21. Further, the third arm 23 has the third rotating part 232 which rotates around the third rotational axis J03 with respect to the second arm 22. Further, the fourth arm 24 has the fourth rotating part 242 which rotates around the fourth rotational axis J04 with respect to the third arm 23. Further, the second rotating part 222 and the third rotating part 232 are arranged side by side in the direction of the second rotational axis J02, and the third rotating part 232 and the fourth rotating part 242 are arranged side by side in the direction of the fourth rotational axis J04. Thus, it is possible to elongate the tip portion of the robot 1 including the third arm 23 and the fourth arm 24 compared to, for example, the configuration in the first embodiment described above, and accordingly, it becomes easy to perform the operation in a narrow place.

According also to such a second embodiment described hereinabove, substantially the same advantages as in the first embodiment described above can be exerted.

Third Embodiment

Figure 8:
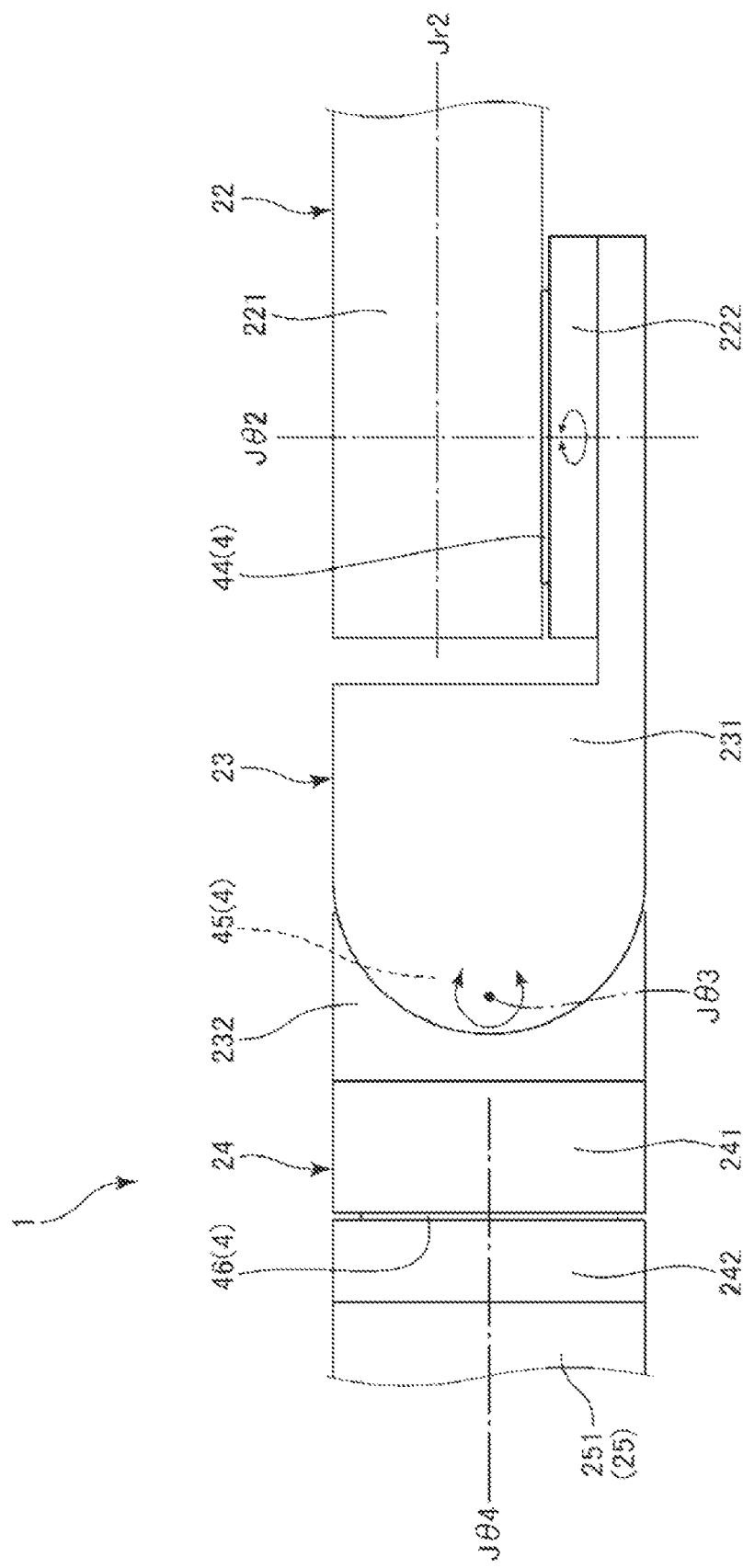
FIG. 8 is a plan view showing a tip portion of a horizontal articulated robot according to a third embodiment of the present disclosure.

FIG. 8 is a plan view showing a tip portion of a horizontal articulated robot according to a third embodiment of the present disclosure.

The robot 1 according to the present embodiment is substantially the same as the robot 1 according to the first embodiment described above except the point that the arrangement of the third arm 23 and the fourth arm 24 is different. Therefore, in the following description, the robot 1 according to the third embodiment will be described with a focus on the difference from the first embodiment described above, and the description of substantially the same issues will be omitted. Further, in FIG. 8, the constituents substantially the same as in the embodiment described above are denoted by the same reference symbols.

As shown in FIG. 8, in the robot 1 according to the present embodiment, the second rotating part 222, the third rotating part 232, and the fourth rotating part 242 are arranged in a line in the horizontal direction. In other words, the third rotating part 232 is arranged in the direction perpendicular to the second rotational axis J02 side by side with the second rotating part 222, and the fourth rotating part 242 is arranged in the direction of the fourth rotational axis J04 side by side with the third rotating part 232. Thus, it is possible to suppress the height of the second arm 22, the third arm 23, and the fourth arm 24 compared to, for example, the configuration in the first embodiment described above, and thus, it is possible to elongate the tip portion of the robot 1 in the horizontal direction. Therefore, it becomes easy to perform an operation in a narrow place where there is a limitation in, for example, a height direction. In particular, in the present embodiment, the third rotating part 232 is located on the second linear-motion axis Jr2 and the fourth rotational axis J04 at any posture. Therefore, the advantage described above becomes more conspicuous.

It should be noted that in the case of the present embodiment, it is preferable to provide the third rotating part 232 with the piezoelectric actuator 451 of the fifth drive mechanism and the piezoelectric actuator 461 of the sixth drive mechanism. Thus, it is possible to further reduce the size of the tip portion of the robot 1, and thus, the advantage described above becomes conspicuous.

According also to such a third embodiment as described hereinabove, substantially the same advantages as in the first embodiment described above can be exerted.

Fourth Embodiment

Figure 9:
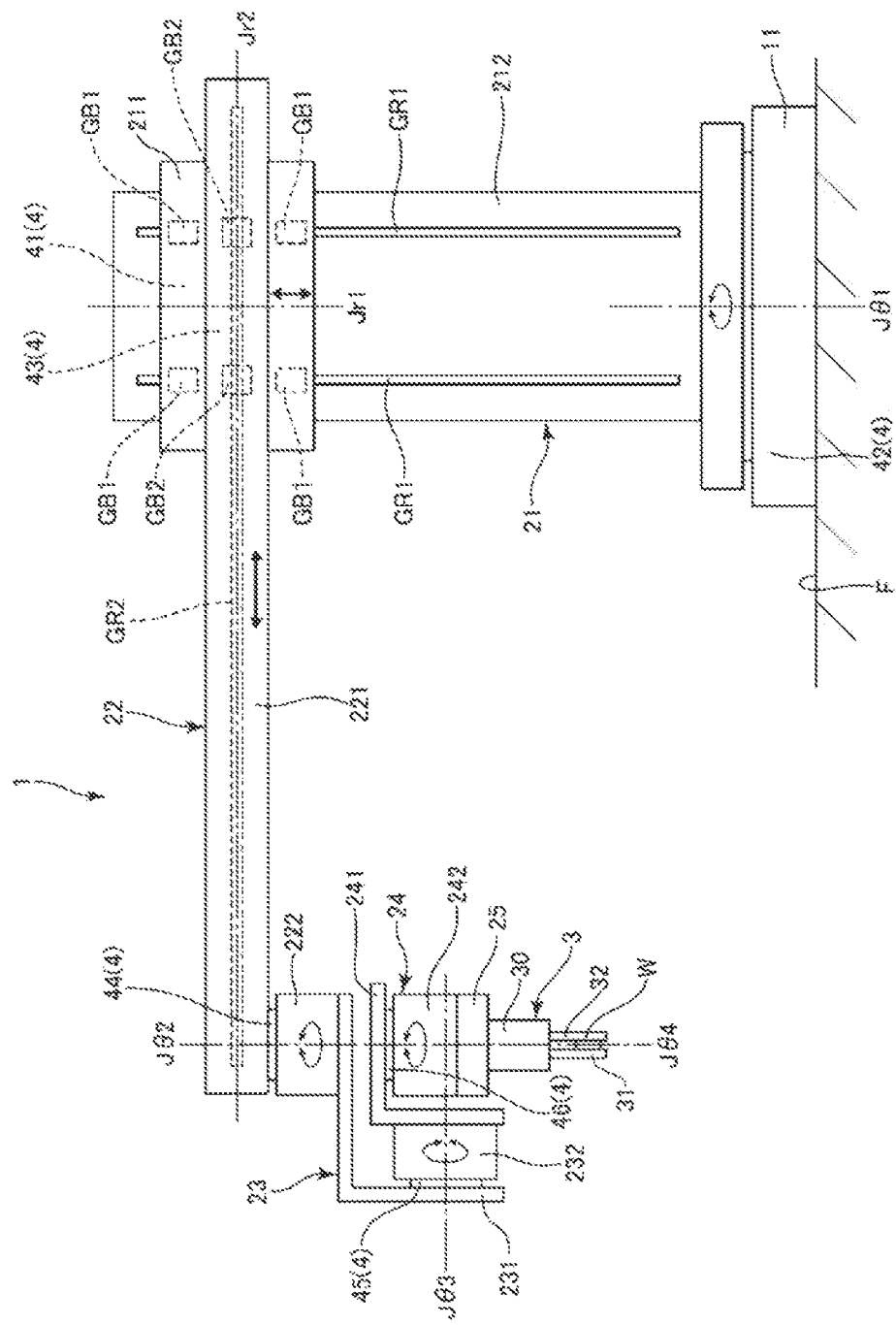
FIG. 9 is a side view showing a horizontal articulated robot according to a fourth embodiment of the present disclosure.

FIG. 9 is a side view showing a horizontal articulated robot according to a fourth embodiment of the present disclosure.

The robot 1 according to the present embodiment is substantially the same as the robot 1 according to the first embodiment described above except the point that the configuration of the first arm 21 is different. Therefore, in the following description, the robot 1 according to the fourth embodiment will be described with a focus on the difference from the first embodiment described above, and the description of substantially the same issues will be omitted. Further, in FIG. 9, the constituents substantially the same as in the embodiment described above are denoted by the same reference symbols.

As shown in FIG. 9, the first arm 21 has the first moving part 211 and the first rotating part 212. Further, the first rotating part 212 is coupled to the platform 11, the first moving part 211 is coupled to the first rotating part 212, and the second arm 22 is coupled to the first moving part 211. In other words, the arrangement of the first moving part 211 and the first rotating part 212 is reversed from that in the first embodiment. Thus, the mass to be added to the first drive mechanism 41 for moving the first moving part 211 in the first linear-motion axis Jr1 becomes smaller compared to the first embodiment described above. Therefore, it is possible to more smoothly perform the locomotion of the first moving part 211. In the first drive mechanism 41, the position of the first moving part 211 is kept using a frictional force generated between the piezoelectric actuator 411 and the driven part 412. Therefore, since the mass to be added to the first drive mechanism 41 becomes smaller, the frictional force becomes sufficient to cope with the mass, and thus, it is possible to more surely keep the first moving part 211 at a predetermined position.

Further, when viewed from the direction shown in the drawing, namely when viewed from a direction perpendicular to the first linear-motion axis Jr1 and the second linear-motion axis Jr2, the second moving part 221 of the second arm 22 is disposed so as to overlap the first moving part 211 and the first rotating part 212. In other words, when viewed from the direction shown in the drawing, the second moving part 221 crosses the first moving part 211 and the first rotating part 212. Therefore, the height of the robot 1 is suppressed compared to, for example, the configuration in the first embodiment in which the second moving part 221 is located above the first moving part 211, and thus, it is possible to achieve the reduction in size of the robot 1. Further, it is possible to move the second arm 22 downward without being hindered by the first arm 21, and thus, the movable range in the vertical direction of the end effector 3 increases. Further, it also becomes easy to ensure the first moving part 211 and the second moving part 221 to be long in stroke.

It should be noted that in the case of the present embodiment, regarding the first drive mechanism 41 for driving the first moving part 211, it is preferable to provide the first guide rail GR1 to the first rotating part 212, and to provide the first guide block GB1 to the first moving part 211. Thus, it is possible to achieve the reduction in size of the first moving part 211 compared to when reversing the arrangement.

As described above, in the robot 1 according to the present embodiment, the first arm 21 has the first moving part 211 which moves along the first linear-motion axis Jr1 with respect to the platform 11, and the first rotating part 212 rotating around the first rotational axis Jθ1 with respect to the platform 11. Further, the first rotating part 212 is coupled to the platform 11, the first moving part 211 is coupled to the first rotating part 212, and the second arm 22 is coupled to the first moving part 211. Thus, it is possible to reduce the load to be applied to the first moving part 211. Further, it is also possible to achieve the reduction in size of the robot 1. Further, it is possible to move the second arm 22 downward without being hindered by the first arm 21, and thus, the movable range in the vertical direction of the end effector 3 increases. Further, it also becomes easy to ensure the first moving part 211 and the second moving part 221 to be long in stroke.

According also to such a fourth embodiment as described hereinabove, substantially the same advantages as in the first embodiment described above can be exerted.

Fifth Embodiment

Figure 10:
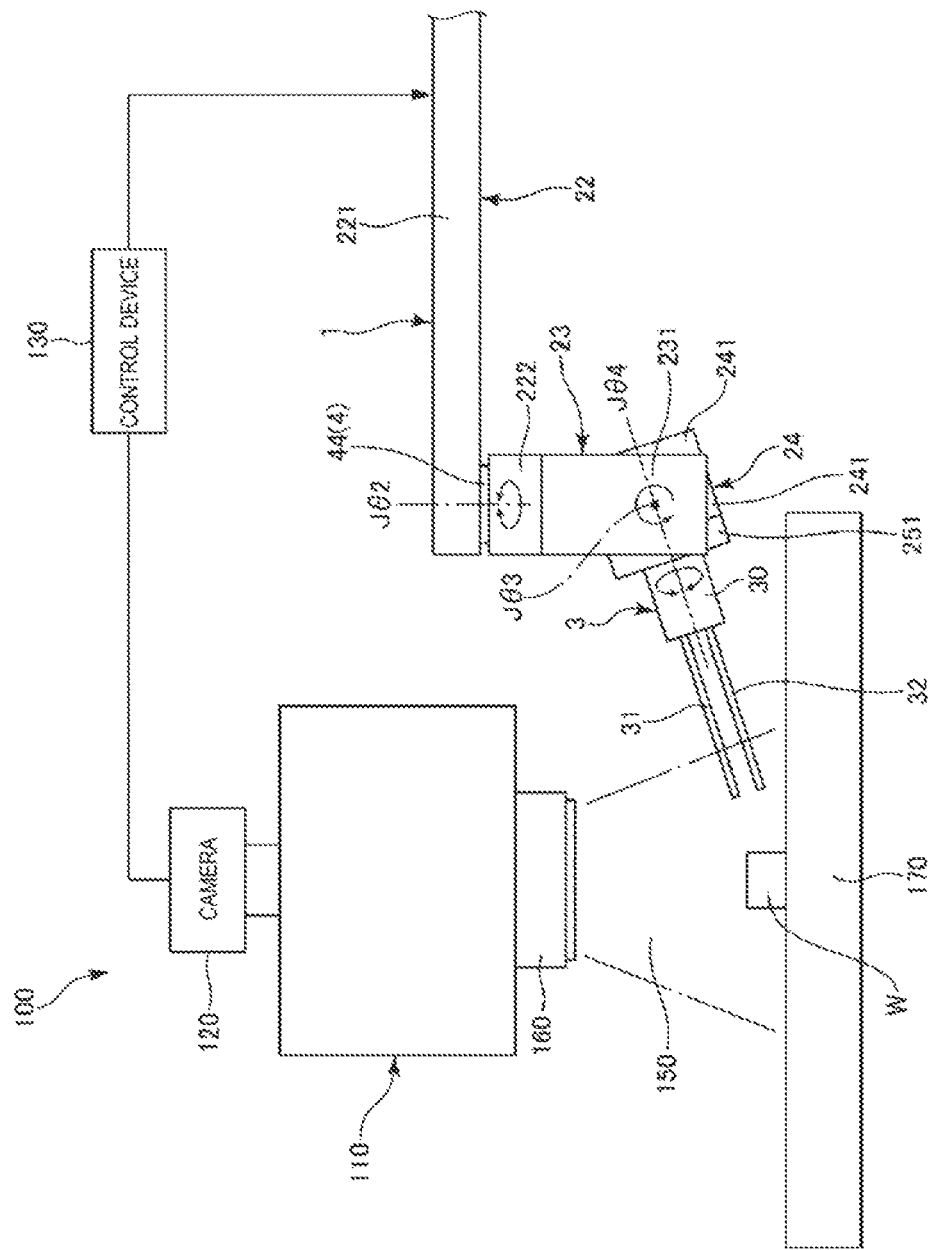
FIG. 10 is a schematic view showing a horizontal articulated robot according to a fifth embodiment of the present disclosure.

FIG. 10 is a schematic view showing a horizontal articulated robotic system according to a fifth embodiment of the present disclosure.

As shown in FIG. 10, the horizontal articulated robotic system 100 has the robot 1, a microscope 110 as a magnifying glass, a camera 120 which is coupled to the microscope 110 and takes an image of the inside of the visual field of the microscope 110, and a control device 130 for controlling the drive of the robot 1 based on the image taken by the camera 120. The visual field of the microscope 110 is extremely small, and further, a working space 150 between an objective lens 160 and a stage 170 is extremely small. Therefore, as described above, by combining the robots 1 suitable for an operation in a narrow place, it is possible to perform a smooth and accurate operation.

As described above, the horizontal articulated robotic system 100 according to the present embodiment has the robot 1, the microscope 110 as the magnifying glass, and the control device 130 for controlling the drive of the robot 1 based on the image obtained via the microscope 110. Thus, it is possible to appreciate the advantage of the robot 1 described above, and even in the visual field of the microscope 110, it is possible to perform the smooth and accurate operation. It should be noted that the magnifying glass is not particularly limited, and can also be, for example, a loupe.

Although the horizontal articulated robot and the horizontal articulated robotic system according to the present disclosure are described hereinabove based on the illustrated embodiments, the present disclosure is not limited to the embodiments, but the configuration of each of the sections can be replaced with one having substantially the same function and an arbitrary configuration. Further, it is possible to add any other constituents to the embodiments described above. Further, it is also possible to arbitrarily combine any of the embodiments described above with each other.

What is claimed is:

1. A horizontal articulated robot comprising:
   a platform;
   a first arm which is coupled to the platform, which moves along a first linear-motion axis with respect to the platform, and which rotates around a first rotational axis parallel to the first linear-motion axis;

a second arm which is coupled to the first arm, which moves along a second linear-motion axis different in direction from the first linear-motion axis with respect to the first arm, and which rotates around a second rotational axis parallel to the first rotational axis, the second arm being L-shaped and configured with a first part and a second part connected via a first drive mechanism, the first part being movably coupled to the first arm, the second part rotating around the second rotation axis and being rotatably connected to a distal end of the first part via the first drive mechanism;

a third arm which is coupled to the second arm, and which rotates around a third rotational axis perpendicular to the first linear-motion axis, the third arm being configured with a third part and a fourth part connected via a second drive mechanism, the third part being L-shaped and connected to a distal end of the second part of the second arm, the fourth part rotating around the third rotation axis and being rotatably connected to a distal end of the third part via the second drive mechanism; and a fourth arm which is coupled to the third arm, and which rotates around a fourth rotational axis perpendicular to the third rotational axis, the fourth arm being configured with a fifth part and a sixth part connected via a third drive mechanism, the fifth part being L-shaped and connected to a distal end of the fourth part of the third arm, the sixth part rotating around the fourth rotation axis and being rotatably connected to a distal end of the fifth part via the third drive mechanism.

2. The horizontal articulated robot according to claim 1, wherein
the first linear-motion axis and the second linear-motion axis are perpendicular to each other.

3. The horizontal articulated robot according to claim 1, wherein
the first arm includes
a first moving part which moves along the first linear-motion axis with respect to the platform, and
a first rotating part which rotates around the first rotational axis with respect to the platform,
the first moving part is coupled to the platform,
the first rotating part is coupled to the first moving part, and
the second arm is coupled to the first rotating part.

4. The horizontal articulated robot according to claim 1, wherein
the first arm includes
a first moving part which moves along the first linear-motion axis with respect to the platform, and
a first rotating part which rotates around the first rotational axis with respect to the platform,
the first rotating part is coupled to the platform,
the first moving part is coupled to the first rotating part, and
the second arm is coupled to the first moving part.

5. The horizontal articulated robot according to claim 1, wherein
the second arm includes
the first part as a second moving part which moves along the second linear-motion axis with respect to the first arm, and the second part as a second rotating part which rotates around the second rotational axis with respect to the first arm,
the second moving part is coupled to the first arm, and
the second rotating part is coupled to the second moving part.

6. The horizontal articulated robot according to claim 1, wherein
the second arm has the second part as a second rotating part which rotates around the second rotational axis with respect to the first arm,
the third arm has the fourth part as a third rotating part which rotates around the third rotational axis with respect to the second arm,
the fourth arm has the sixth part as a fourth rotating part which rotates around the fourth rotational axis with respect to the third arm,
the second rotating part and the fourth rotating part are arranged side by side in a direction of the second rotational axis, and
the third rotating part and the fourth rotating part are arranged side by side in a direction of the third rotational axis.

7. The horizontal articulated robot according to claim 1, wherein
the second arm has the second part as a second rotating part which rotates around the second rotational axis with respect to the first arm,
the third arm has the fourth part as a third rotating part which rotates around the third rotational axis with respect to the second arm,
the fourth arm has the sixth part as a fourth rotating part which rotates around the fourth rotational axis with respect to the third arm,
the second rotating part and the third rotating part are arranged side by side in a direction of the second rotational axis, and
the third rotating part and the fourth rotating part are arranged side by side in a direction of the fourth rotational axis.

8. The horizontal articulated robot according to claim 1, wherein
the third drive mechanism is configured to rotate the fourth arm around the fourth rotational axis with respect to the third arm, and
the third drive mechanism has a drive source provided with a piezoelectric element.

9. The horizontal articulated robot according to claim 8, further comprising:
a cover part configured to cover the third drive mechanism.

10. The horizontal articulated robot according to claim 1, further comprising:
a sensor configured to detect one of approach and contact of an object.

11. A horizontal articulated robotic system comprising:
the horizontal articulated robot according to claim 1;
a magnifying glass; and
a control device configured to control drive of the horizontal articulated robot based on an image obtained via the magnifying glass.

* * * * *